United States Patent [19]

Tojo et al.

[11] Patent Number: 4,950,135
[45] Date of Patent: Aug. 21, 1990

[54] PIEZOELECTRIC POWERED SCROLL COMPRESSOR

[75] Inventors: Kenji Tojo; Shigeru Machida, both of Ibaraki; Kenji Mori, Tsuchiura, all of Japan

[73] Assignee: Hitachi, Ltd., Tokyo, Japan

[21] Appl. No.: 268,197

[22] Filed: Nov. 7, 1988

[30] Foreign Application Priority Data

Nov. 12, 1987 [JP] Japan .............................. 62-286085
Aug. 22, 1988 [JP] Japan .............................. 63-207522

[51] Int. Cl.$^5$ ...................... H01L 41/09; F04C 18/04
[52] U.S. Cl. .................................. 417/410; 418/55.5; 310/323; 310/328
[58] Field of Search ............... 417/410, 322; 310/321, 310/323, 328; 418/55 D

[56] References Cited

U.S. PATENT DOCUMENTS

| | | | |
|---|---|---|---|
| 4,522,575 | 6/1985 | Tischer et al. | 418/55 |
| 4,552,518 | 11/1985 | Utter | 418/55 |
| 4,613,782 | 9/1986 | Mori et al. | 310/323 |
| 4,779,018 | 10/1988 | Okuno et al. | 310/328 |
| 4,788,468 | 11/1988 | Izukawa et al. | 310/323 |
| 4,814,660 | 3/1989 | Yamada et al. | 310/323 |

*Primary Examiner*—Leonard E. Smith
*Assistant Examiner*—David W. Scheuermann
*Attorney, Agent, or Firm*—Antonelli, Terry, Stout & Kraus

[57] ABSTRACT

A scroll-type fluid machine comprises a stationary scroll member and an orbiting scroll member, each having an end plate and a spiral wrap projecting radially from the end plate, the stationary and orbiting scroll members being assembled with their wraps meshing with each other to define a plurality of compression chambers. A plurality of expanding and contracting actuators are secured on a frame and contact with the orbiting scroll member. The actuators are driven by respective A.C. voltages supplied from a driving circuit. The contact points between the actuators and the orbiting scroll member are progressively moved by expanding and contracting motions of the actuators energized by supplied voltages, the A.C. voltages for energizing the actuators being different in phase from each other so that the orbiting scroll member orbits without rotating on its own axis. The actuators also serve to confine an axial movement of the orbiting scroll member and to prevent the orbiting scroll member from disengaging from the stationary scroll member. With this arrangement, a compact, light-weight, oil-free and low-noise scroll-type fluid machine can be provided.

21 Claims, 11 Drawing Sheets

PIEZOELECTRIC POWERED SCROLL COMPRESSOR

BACKGROUND OF THE INVENTION

The present invention relates to a scroll-type fluid machine for transporting and boosting gases or liquids and, more particularly, to a small-sized scroll-type fluid machine which is suitable for handling a fluid having very small flow rate.

As known to those skilled in the art, a scroll-type fluid machine has an orbiting scroll member including an end plate and a spiral wrap axially projecting from the end plate, and a stationary scroll member having a construction similar to the construction of the orbiting scroll member. These scroll members are assembled together such that their wraps mesh with each other. The orbiting scroll member is driven so as to make an orbiting motion around the axis of the stationary scroll member without rotating on its own axis.

In known scroll-type fluid machines, a rotation prevention member such as an Oldham's coupling is disposed between the orbiting scroll member and the stationary scroll member, as disclosed in the specifications of U.S. Pat. Nos. 4,522,575 and 4,552,518. The orbiting motion of the orbiting scroll member is effected by a crankshaft having an eccentric pin which engages with the orbiting scroll member. As the crankshaft is driven by a motor, the orbiting scroll member engaging with the crank pin orbits around the axis of the stationary scroll member without rotating on its own axis. In consequence, chambers varying in volume are formed among the wraps and the end plates of both scroll members so as to suck and compress the fluid, thereby transporting or boosing the fluid.

Since, in the known scroll-type fluid machine, a rotation prevention member such as an Oldham's coupling for preventing the orbiting scroll member from rotating on its own axis, a crankshaft for converting the rotational motion of a motor to the orbiting motion of the orbiting scroll member and the electric motor having a large volume and a heavy weight for producing the required driving power are used, it is difficult for the known machine to have a small size and a light weight. In addition, an oil-free construction can hardly be provided in the known machine because of the necessity for lubrication of the bearings which rotatably support the crankshaft. Furthermore, electromagnetic sounds generated by the electric motor causes high levels of vibration and noise.

Hitherto, discussions have been done in regard to the driving of the orbiting scroll member, and various improved arrangements have been proposed which can support the orbiting scroll member stably during driving. In most cases, the orbiting motion of the orbiting scroll member is made by a crankshaft which engages with a central portion of the orbiting scroll member, so that the orbiting scroll member receives a moment of force due to centrifugal force, pressure of the gas and the crankshaft. The moment of force applied to the orbiting scroll member causes fluttering motion of the orbiting scroll member during the orbiting motion. Since the outer peripheral portion of the orbiting scroll member flutters within a very small clearance defined by the frame of the machine and the outer peripheral portions of the stationary scroll member and the orbiting scroll member, vibration and noise are generated by the outer peripheral portion of the orbiting scroll member contacting with the adjacent portions of the frame and the stationary scroll member.

SUMMARY OF THE INVENTION

A first object of the present invention is to provide a scroll-type fluid machine having a small size and a light weight, in which the orbiting motion of the orbiting scroll member is caused by a plurality of piezoelectric motors without any mechanism for preventing the orbiting scroll member from rotating on its own axis, e.g., an Oldham's coupling.

A second object of the present invention is to provide a scroll-type fluid machine having an oil-free construction.

A third object of the present invention is to provide a scroll-type fluid machine in which the motion of the orbiting scroll member is stable so that vibration and noise are reduced.

To these ends, according to the present invention, there is provided a scroll-type fluid machine, which comprises a frame, a stationary scroll member having an end plate and a spiral wrap whose spiral shape is an involute curve or the similar curve and which axially projects from one side of the end plate, an orbiting scroll member having an end plate and a spiral wrap whose spiral shape is similar to the spiral shape of the stationary scroll member and which axially projects from the end plate, the stationary scroll member and the orbiting scroll member being assembled together with their wraps meshing with each other and with the end plates parallel with each other, the stationary scroll member being fixed at its peripheral portion to the frame, the orbiting scroll member being supported on the frame and orbiting on the frame, a plurality of piezoelectric motors being provided on the frame and generating driving power applied to a rear surface of the orbiting scroll member, and a driving circuit for supplying driving signals to control the piezoelectric motors, the driving signals being different in phase from each other, the difference in phase between the driving signals corresponding to the difference in position between the piezoelectric motors so that the orbiting scroll member orbits around the axis of the stationary scroll member without rotation on its own axis.

The scroll-type fluid machine having these component parts brings about following advantages.

Firstly, since the orbiting scroll member is directly driven by piezoelectric motors, any mechanism for preventing the orbiting scroll member from rotating on its own axis, such as Oldham's coupling, is not used, so that the size and weight of the scroll-type fluid machine according to this invention can be remarkably reduced as compared with known scroll-type fluid machine which is driven by an conventional electric motor. Incidentally, the axial length of the whole machine can be reduced.

Secondly, a completely oil-free machine can be provided because the actuator means such as a plurality of piezoelectric motors can operate without lubrication though they have contacting vibratory portions. Furthermore, the reliability of the machine is improved because the amount of sliding parts such as bearings can be remarkably reduced. The piezoelectric motor is made from a corrosion-resistant material such as ceramics material, so that the scroll-type fluid machine of the present invention can be used as a vacuum pump in a semiconductor production system and the like.

Thirdly, since the piezoelectric motors support directly the orbiting scroll member and bear a thrust force thereof without any gap therebetween, variation in the gap between the wraps of both scroll members are small, and unstable motion of the orbiting scroll member such as fluttering motion is avoided, although a moment of force is generated by the pressure of the gas during operation, so that the low vibration and the high efficiency are effected.

It is also to be noted that the piezoelectric motors do not generate any electromagnetic noise and do not include any bearings, so that the level of noise of the machine can be remarkably reduced.

DESCRIPTION OF THE PREFERRED EMBODIMENTS

A preferred embodiment of the scroll-type fluid machine of the present invention will be described with reference to FIGS. 1 to 4. The scroll-type fluid machine has a stationary scroll member 2 comprising an end plate 2a and a scroll wrap 2b which projects axially from one side of the end plate 2a and has a curve which is a combination of an involute curve and arcs. The stationary scroll member 2 is provided at its outer peripheral portion with a gas suction port 8 and at its central portion with a gas discharging port 14. The stationary scroll member 2 is fixed at its outer peripheral flange portion to a frame 4 which is a stationary member. The scroll-type fluid machine also has an orbiting scroll member 3 comprising an end plate 3a and a scroll wrap 3b which has substantially the same shape as the wrap 2b of the stationary scroll member 2. The wrap 3b projects from the end plate 3a in the axial direction of the end plate 3a. The orbiting scroll member 3 meshes with the stationary scroll member 2 and is disposed in place between thrust bearings 24 provided on the stationary scroll member 2 and a plurality of actuators 20 fixed on the frame 4. The actuators 20 contact with sliders 21 which are fixed to the orbiting scroll member 3. The actuators 20 and the slider 21 constitute a piezoelectric motor. The maximum horizontal distance between the wraps 2b, 3b meshing with each other is substantially equal to 2$\epsilon$, where $\epsilon$ represents the radius of orbiting motion of the orbiting scroll member 3. The actuators 20 of the piezoelectric motors are connected to a driving circuit 22 through electric signal lines. The sliders 21 fixed on the end plate 3a of the orbiting scroll member 3 are pressed strong against the actuators 20 of the piezoelectric motors by the thrust bearings which are made of a material suitable for sliding. As will be seen from FIG. 2, each actuator 20 in the present invention has a ringlike form with a radius which is substantially equal to the radius $\epsilon$ of the orbiting motion the orbiting scroll member 3. A plurality of such actuators 20 with the same shapes are arranged on the surface of the frame 4 which faces the reverse surface of the plate 3a of the orbiting scroll member 3, i.e., the surface opposite to the surface facing the stationary scroll member 2. More specifically, one of these actuators is disposed on the center of the frame 4, while the other actuators 20 are disposed on a peripheral portion of the frame 4 along a circle.

Figure 2:
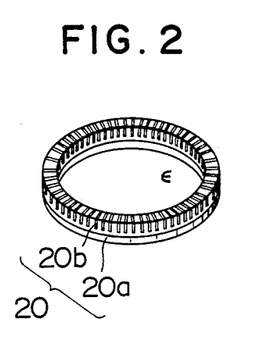
FIG. 2 is a perspective view of the stator of a piezoelectric motor incorporated in the embodiment shown in FIG. 1.
Figure 3:
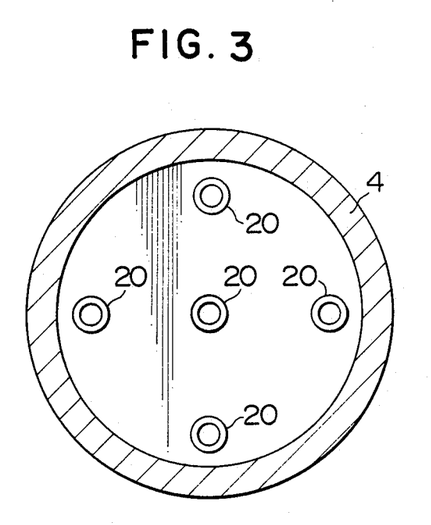
FIG. 3 is a schematic illustration of an arrangement of a plurality of piezoelectric motors shown in FIG. 1.
Figure 4A:
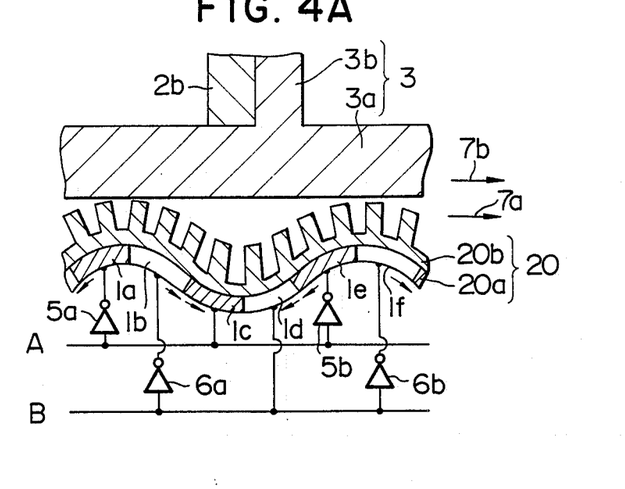
FIG. 4 is an illustration of the motion of the embodiment shown in FIG. 1.
Figure 4B:
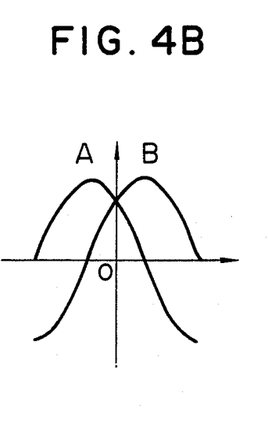
Figure 4C:
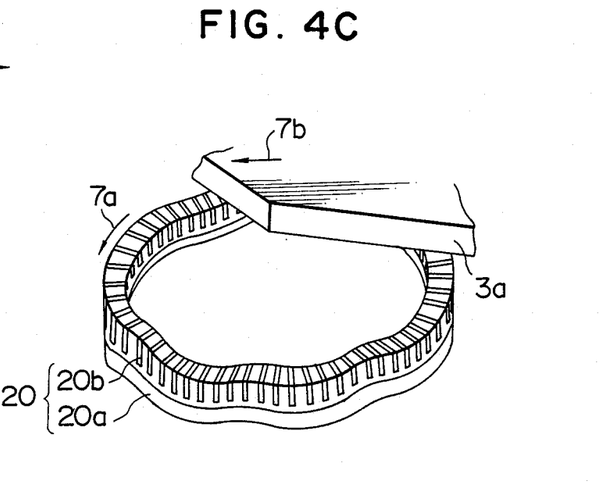

As will be seen from FIG. 2, the actuator 20 is composed of a piezoelectric element 20a and a grooved oscillator 20b. More specifically, as shown in FIG. 4(a), the piezoelectric element 20a is composed of partitioned laminar piezoelectric elements 1a, 1b and so forth which are adhered to the reverse side of the grooved oscillator 20b. The laminar piezoelectric segments 1a, 1b, 1e, 1f and so forth are supplied with driving voltage through inverter amplifiers 5a, 6a, 5b, 6b and so forth. The driving circuit supplies the lines A and B shown in FIG. 4(b) with respective A.C. voltages having a 90° difference in phase. In consequence, the piezoelectric segments 1a, 1b and so forth expand and contact with 90° vibration difference in phase so as to generate a winding progressive wave in the grooved oscillator 20b in the direction denoted by an arrow 7a. Therefore, when high-frequency voltages of supersonic frequency region with 90° wave difference in phase are applied to the piezoelectric element 20a, a progressive wave of a small amplitude is generated in the oscillator 20b so that the actuators 20 move successively the contact points between each oscillator 20 and the associated slider 21 fixed on the orbiting scroll member 3. In consequence, the orbiting scroll member 3 is moved in the same direction as the direction of the progressive wave as shown in Figs. 4(a) and 4(c). The orbiting motion of the orbiting scroll member is caused by a combination of the forces of all the actuators 20.

Figure 1:
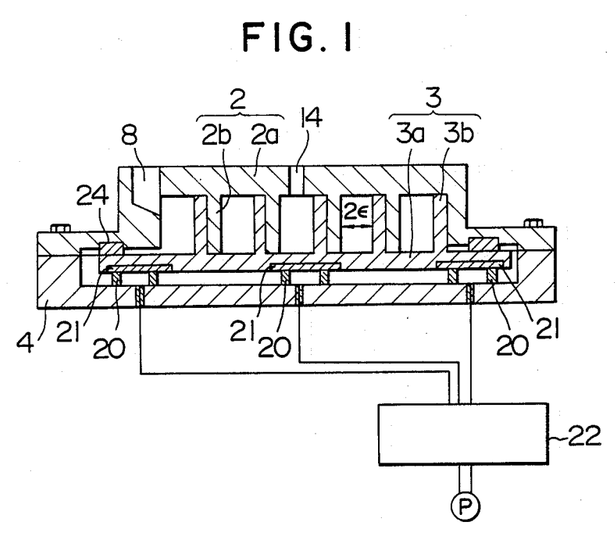
FIG. 1 is a sectional side elevation of a first embodiment of the scroll-type fluid machine in accordance with the present invention.

As will be seen from FIG. 1, all the piezoelectric motors are driven by the same driving circuit 22. Therefore, progressive waves with uniform phase are generated in all the actuators 20 so that the orbiting scroll member 3 is smoothly orbited. Furthermore, since the orbiting scroll member 3 is firmly supported by the thrust bearings 24 and the piezoelectric motors, a stable orbiting motion can be provided without any fluttering motion. The piezoelectric motors not only provide the orbiting motion of the orbiting scroll member 3 but also provide a force which prevents the orbiting scroll member from rotating on its own axis. The piezoelectric motor is generally known and referred to as "supersonic motor" because the oscillator 20b operates in response to high-frequency voltage of supersonic frequency region.

In operation, electrical power is supplied to the driving circuit 22 from a power supply P so that the piezoelectric motors are activated. The orbiting scroll member 3 orbits without collision between the wrap 3b thereof and the wrap 2b of the stationary scroll member 2. By the orbiting motion of the orbiting scroll member 3, a gas is sucked through the suction port 8 is compressed in a compression chamber between the wraps 2b and 3b of both scroll members and is discharged from the discharge port 14. When the machine is drived in reverse direction, a gas is sucked through the port 14 and is compressed and then discharged through the port 8. The described operation of the scroll-type fluid machine can be executed without any lubricant for lubricating sliding parts of the machine, so that a completely oil-free machine, capable of discharging clean gas without any oil content, can be provided. In the described embodiment, the piezoelectric motors are disposed between the frame 4 and the orbiting scroll member. Alternatively, the piezoelectric motors may be arranged between the outer peripheral portion of the end plate of the stationary scroll member and the outer peripheral portion of the end plate of the orbiting scroll member. In such a case, the thrust bearings 24 are arranged on the frame 4.

Figure 5:
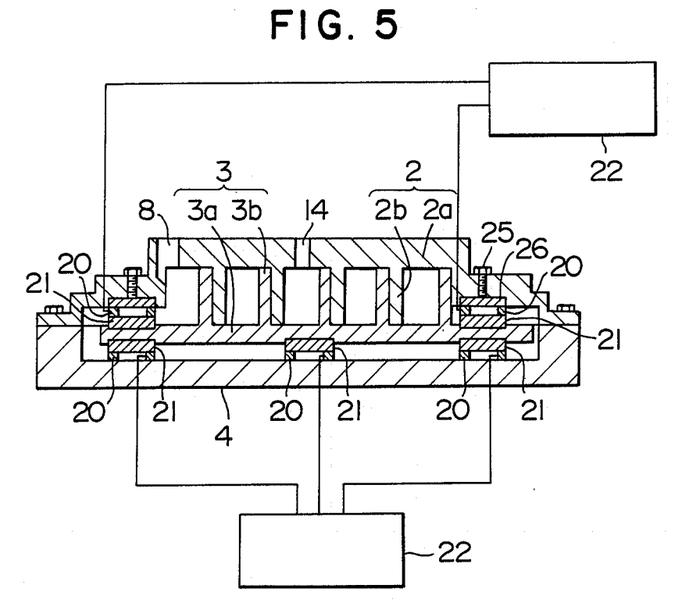
FIG. 5 is a sectional side elevation of a second embodiment.

FIG. 5 shows another embodiment of the present invention. In this embodiment piezoelectric motors are the same as the first embodiment. In this embodiment, however, the piezoelectric motors are arranged on both the upper and lower surfaces of the end plate 3a of the orbiting scroll member 3 at a peripheral portion of the end plate 3a.

More specifically, a plurality of actuators 20 are disposed along an identical circle on both sides of the end plate 3a. Further, one piezoelectric motor is disposed on the central portion of the lower surface of the end plate 3a so as to prevent the end plate 3a from being deformed by the pressure of the gas increased in the compression chamber. Each of the actuators 20 for driving the orbiting scroll member is a ring-shaped actuator having a radius substantially equal to the radius of the orbiting motion of the orbiting scroll member. The piezoelectric motors disposed on the upper surface of the end plate 3a as viewed in FIG. 5 are pressed against the orbiting scroll member 3 by pressing plates 26 and tightening members 25. In consequence, the piezoelectric motors disposed on the lower surface of the end plate 3a also are pressed through the end plate 3a. The piezoelectric motors on the upper surface of the end plate 3a and the peizoelectric motors on the lower surface of the end plate 3b are driven by respective driving circuits 22 and 22', the piezoelectric motors on the lower surface of the end plate 3a generate forces whose direction is the same as forces generated by the piezoelectric motors on the upper surface of the end plate 3a, so that the orbiting scroll member 3 is driven by double the force of the embodiment shown in FIG. 1. In the embodiment shown in FIG. 5, slide portions such as the thrust bearings 24 used in the embodiment shown in FIG. 1 are not used and the thrust forces are born by the piezoelectric motors, so that the orbiting scroll member 3 can orbit very stably. Another advantage is that the mechanical loss of energy is reduced because the orbiting scroll member has no slide portion.

Figure 6:
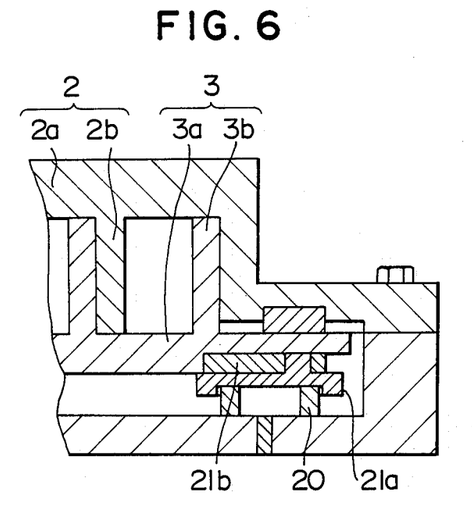
FIG. 6 is a sectional side elevation of a third embodiment.

FIG. 6 shows an embodiment in which ring-shaped piezoelectric motors are incorporated. A reference numeral 21a denotes a guide-equipped slider having a guide whose inner diameter is greater than the outside diameter of the actuator 20 and which limits radial movement of the slider. The slider has an eccentric pin whose eccentric distance from the central axis of the ring-shaped piezoelectric motor is equal to the radius ϵ of orbiting motion of the orbiting scroll member 3. A numeral 21b denotes a slider having a hole in which the pin is rotatably fitted and being fixed in a recess formed in the orbiting scroll member 3. The other parts are the same as the embodiment shown in FIG. 1. When the actuators 20 are supplied with A.C. voltages of a high frequency from the driving circuit 22, the actuator 20 are energized so as to rotate the sliders 21a. The sliders 21a move the sliders 21b with the eccentric pin, so that the orbiting scroll member 3 orbits without rotating on its own axis. By this movement of the orbiting scroll member 3, a gas is sucked through the suction port 8 and is compressed in the compression chamber formed between the wraps 2b and 3b of both scroll members 2 and 3. The thus compressed gas is discharged from the discharge port 14. As in the case of the preceding embodiment, the piezoelectric motors may operate also as a thrust bearings, and/or may be arranged on both sides of the orbiting scroll member 3.

By using the piezoelectric motors in the scroll-type fluid machine as the present invention, the scroll-type fluid machine can be designed to have a reduced height or axial length, so that the overall size and weight of the scroll-type fluid machine can be remarkably reduced as compared with conventional scroll-type fluid machine driven by electric motors. In addition, reliability is very much enhanced by extreme decrease of the amount of sliding parts such as bearings. The piezoelectric motors, though they have sliding contact portions between the actuators and sliders, can operate without lubrication, so that a completely oil-free scroll-type fluid machine can be provided. Furthermore, since the piezoelectric motors support and guide the orbiting scroll member without any clearance therebetween while bearing the thrust force of the orbiting scroll member, variation of the clearance between the wraps of both scroll members is suppressed and unstable movement of the orbiting scroll member such as fluttering motion is not developed by the moment of force which is caused by the compressed gas during rotation of the orbiting scroll member, whereby low vibration and high efficiency of the machine are carried out. The piezoelectric motor, which does not generate any magnetic field by electrical power, provides a scroll-type fluid machine which is completely free from magnetism. Since electromagnetic sound does not occur and the bearings are not necessary, the noise of the whole machine is remarkably reduced. Further, the piezoelectric motor not only serves as a driving power source for generating orbiting motion of the orbiting scroll member but also serves as means for preventing the orbiting scroll member from rotating on its own axis. Still further, the piezoelectric motors are made of, for example, a ceramics material which has a high resistance to corrosion, so that the scroll-type fluid machine of the present invention can be used as a vacuum pump in a system for producing semiconductor devices.

A different embodiment of the present invention will be described with reference to FIGS. 7 and 8. In this embodiment, linear piezoelectric motors are arranged in place of the ring-shaped piezoelectric motors which are used in the preceding embodiments. More specifically, in the embodiment shown in FIGS. 7 and 8, four linear piezoelectric motors are arranged on the reverse surface of the end plate 3a of the orbiting scroll member 3, and each linear piezoelectric motor is comprising an actuator 20 and a slider 21. As will be seen from FIG. 8, the two axes of two pairs of the linear piezoelectric motors facing each other in the diametrical direction cross each other perpendicularly. For instance, one of these two pairs of linear piezoelectric actuators 20 has a common axis Y—Y, while the other pair of linear piezoelectric actuators has a common axis X—X. The pair of linear piezoelectric actuators arranged on the X-axis and the other pair of linear piezoelectric actuators arranged on the Y-axis are driven by respective driving circuits 22a and 22b.

The actuator 20 of the linear piezoelectric motor is composed of a piezoelectric element and an oscillator, and is fixed to the frame 4. On the other hand, the slider 21 of the linear piezoelectric motor is fixed to the orbiting scroll member 3. When electrical powers are supplied to the linear piezoelectric motors from the driving circuits, the movements of the linear piezoelectric motors of the X axis are different from those of the Y axis in phase, the difference in phase being 90°, so that a composite force by these movements causes the orbiting scroll member 3 to orbit at a constant radius without rotating on its own axis.

Figure 7:
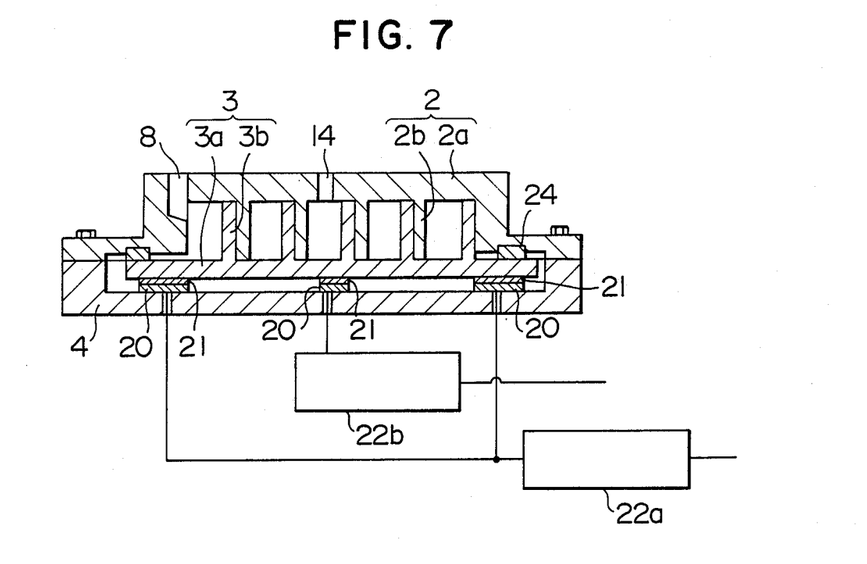
FIG. 7 is a sectional side elevation of a fourth embodiment of the present invention.
Figure 8:
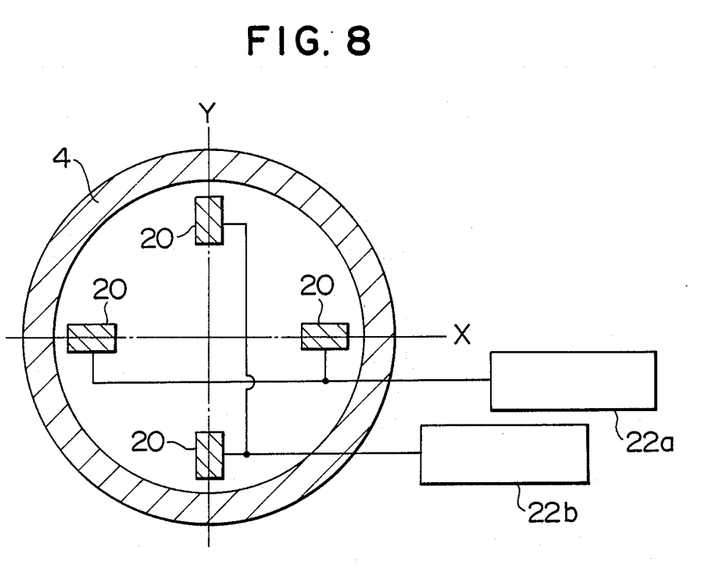
FIG. 8 is a schematic illustration of an arrangement of a plurality of piezoelectric motors used in the embodiment shown in FIG. 7.

An alternative arrangement of the linear piezoelectric motors to the arrangement shown in FIG. 7 is that the linear piezoelectric motors are arranged between a peripheral portion of the stationary scroll member and a peripheral portion of the orbiting scroll member. In such a case, the thrust bearings 24 are arranged on the frame 4. The linear piezoelectric motors may be arranged on both surfaces of the orbiting scroll member instead of the thrust bearings 24.

Figure 9:
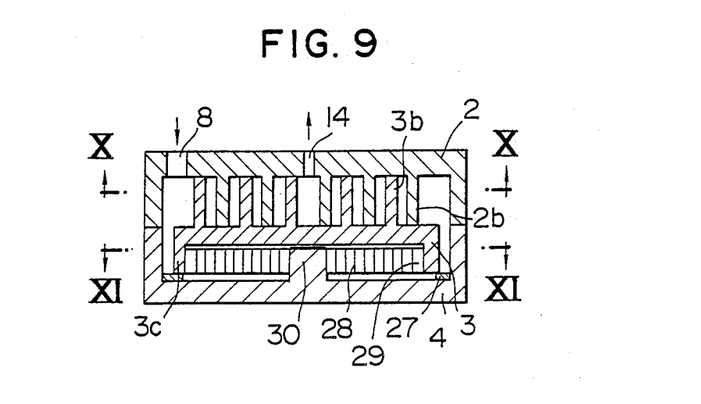
FIG. 9 is a vertical sectional view of a fifth embodiment of the present invention.
Figure 10:
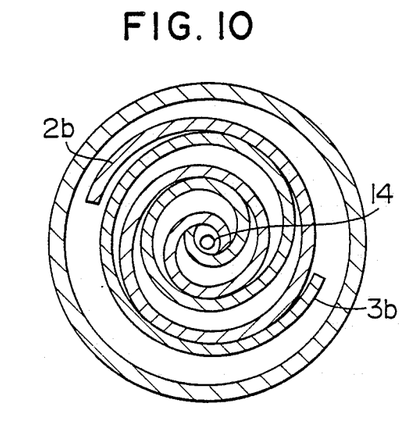
FIG. 10 is a sectional view taken along the line I—I of FIG. 9.
Figure 11:
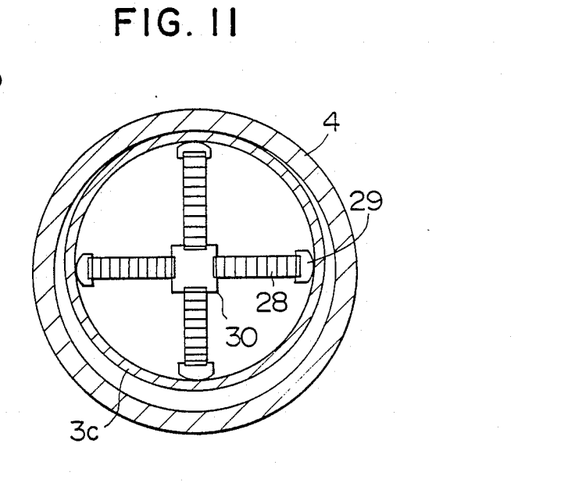
FIG. 11 is a sectional view taken along the line II—II of FIG. 9.

A different embodiment of the present invention in which linear piezoelectric actuators are used, will be described with specific reference to FIGS. 9 to 13. FIG. 9 is a vertical sectional view of this embodiment of the scroll-type fluid machine, FIG. 10 is a sectional view taken along the line I—I of FIG. 9, and FIG. 11 is a sectional view taken along the line II—II of FIG. 9. The driving circuit 22 for driving the actuators is not shown in these FIGS.

The piezoelectric fluid machine has a stationary scroll member including an end plate 2a and a wrap 2b projecting axially from one side of the end plate 2a, the wrap 2b having a spiral form which has an involute curve or a similar curve. The machine also has an orbiting scroll member 3 having an end plate 3a and a spiral wrap 3b projecting axially from one side of the end plate 3a. The stationary scroll member 2 and the orbiting scroll member 3 are assembled together, their wraps 2b, 3b meshing with each other as shown in FIG. 9. The stationary scroll member 2 is fixed at its peripheral portion on the frame 4 while the orbiting scroll member contacts at the peripheral portion of the rear surface with a thrust seat 27 arranged on the frame 4, so that the axial movement of the orbiting scroll member 3 is limited. A plurality of linear actuators 28 of piezoelectric elements are arranged radially in the portions of the frame 4 facing the rear surface of the orbiting scroll member 3 around the center of the stationary scroll member 2. More specifically, each piezoelectric linear actuator has a plurality of thin ceramics piezoelectric elements which are laminated, are bonded with each other and form a bar-like member. One end of each piezoelectric linear actuator is fixed to a seat 30 arranged on the center of the frame 4, while the other end contacts, through a shoe 29, with the inner surface of a seat 3c arranged on a peripheral portion of the rear surface of the orbiting scroll member 3.

A.C. voltages for driving linear piezoelectric actuators 28 are different from each other in phase, the differences in phase correspond to the angles $\alpha_i$ between the radially arranged linear piezoelectric actuators 28. Each linear actuator 28 transforms in a plane parallel to the plane of the orbiting end plate 3b in the longitudinal direction of the actuator disposed radially, an amount of the transform is calculated by the following formula:

$$\epsilon = \epsilon_0 \sin(\omega_t + \alpha_i)$$

Figure 12:
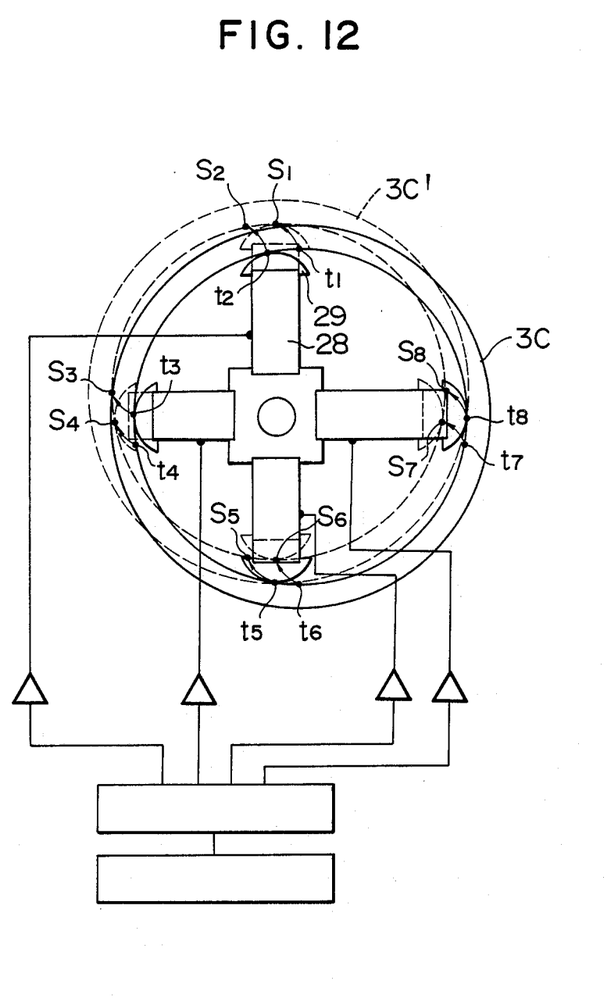
FIG. 12 is an illustration of the motion of the embodiment shown in FIG. 9.
Figures 13A, 13B, 13C, 13D:
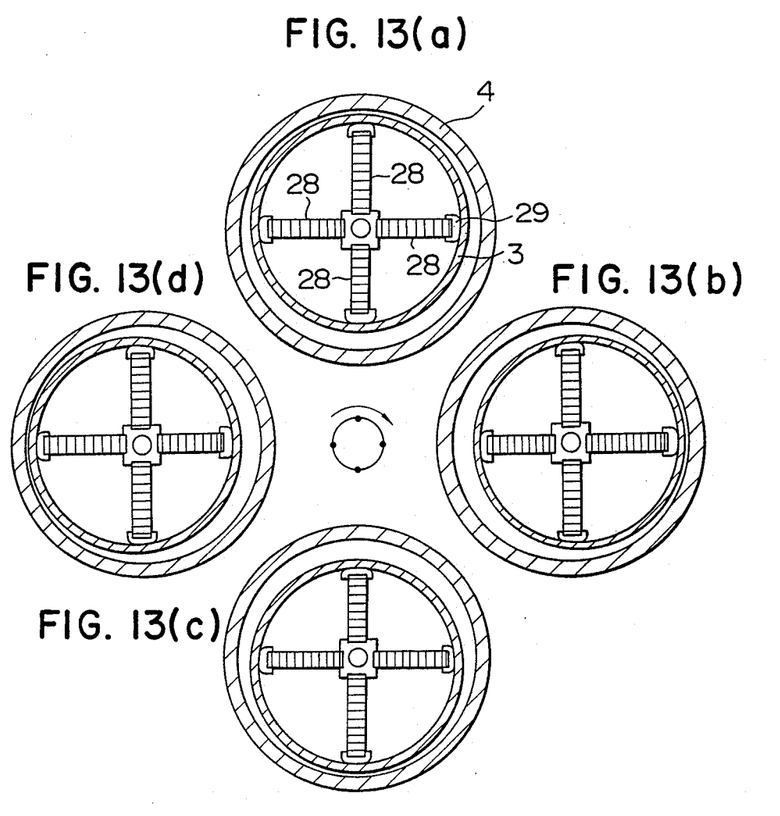
FIGS. 13(a) to 13(d) are illustrations of the motion of the embodiment shown in FIG. 9.

As the linear actuators 28 are transformed in the above mentioned manner the contact points $t_2$, $t_3$, $t_5$ and $t_8$ between the shoes 29 and the seat 3C are shifted to positions denoted by $S_1$, $S_4$, $S_6$ and $S_7$ as shown in FIG. 12, the seat 3C is shifted to a position denoted by 3C′, whereby the orbiting scroll member 3 is orbited. Thus, the orbiting scroll member 3 is driven by the actuators 28 such that every point of the orbiting scroll member 3 orbits along a circle of a radius $\epsilon_0$.

Figure 14:
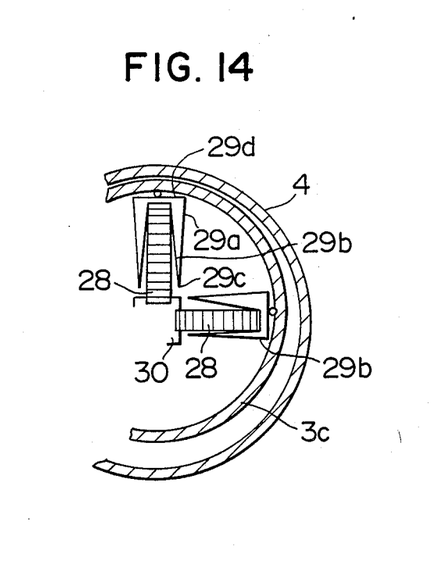
FIG. 14 is an illustration of another embodiment of the supporting seat shown in FIG. 9.

In consequence, the orbiting scroll member 3 orbits around the axis of the stationary scroll member 2 with a radius $\epsilon_0$ without rotating on its own axis. When the orbiting scroll member 3 orbits in the clockwise direction as viewed in FIG. 10, the closed chambers defined by the wraps and end plates of both scroll members 2 and 3 move towards the center of the stationary scroll member 2 and the volumes of the closed chambers decrease successively. In consequence, the scroll-type fluid machine operates as a scroll compressor which sucks a gas from the suction port 8 placed at an outer peripheral portion of the stationary scroll member 2 and discharges the compressed gas through a discharge port placed at the center of the end plate 2a of the stationary scroll member 2. During operation of the scroll compressor, the pressurized fluid in the closed chamber produces a force to separate scroll members away from each other. Obviously, separation of scroll members from each other disturbes compression and transportation of the fluid. In order to avoid such separation, in the described embodiment, the orbiting scroll member 3 is supported at its peripheral portion of the reverse surface thereof by a thrust seat 27 which is arranged on the frame 4, whereby the orbiting scroll member 3 is prevented from moving away from the stationary scroll member 2. The shoes 29 disposed between the piezoelectric actuators 28 and the seat 3C extending from the rear surface of the end plate 3a of the orbiting scroll member contact with the seat 3C and slide on the seat 3C so that the orbiting scroll member 3 can orbit. FIG. 14 illustrates another example of the shoe 29. The shoe 29 shown in FIG. 14 is flexible in the circumferential direction so that it can slightly move. More specifically, the shoe 29 shown in FIG. 14 includes a leaf spring 29a which is connected at its one end to a shoe base 29d secured swingably to the inner surface of the seat 3C of the orbiting scroll member 3 and another leaf spring 29b having one end connected to one end of the linear actuator 28, the leaf springs 29a and 29b being connected to each other at the other ends. According to this arrangement, the flexible shoes 29 absorb circumferential displacement between the actuator 28 and the orbiting scroll member 3 without any slide therebetween, so that the orbiting scroll member can orbit. The flexible shoes 29 has enough stiffness to transmit a force of the piezoelectric actuator 28 to the orbiting scroll member 3 and to prevent the orbiting scroll member 3 from rotating on its own axis, so that any other mechanism for preventing the orbiting scroll member 3 from rotating on its own axis is not necessary. Another embodiment of the present invention will be described with reference to FIG. 15. Since the strain of the linear actuator of piezoelectric elements is very small, for a large radius of orbiting motion of the orbiting scroll member, it is necessary for the scroll machine to have mechanisms which magnify the strains of the linear actuators. In the embodiment shown in FIG. 15, each of the magnifying mechanisms has, a pair of piezoelectric linear actuators 28 which are arranged around the central axis of the stationary scroll member 2 at uniform distance therefrom and which are oriented perpendicularly to the rear surface of the orbiting scroll member 3, a lever 32 whose central portion is swingably supported on a central seat 30 of the frame 4 through a ball joint 31 and the like, and levers 33 each of which is swingably connected through pin 35 to stationary bracket 34 whose one end is swingably connected to the lever 32 and whose another end is connected with the inner surface of the seat 3C of a peripheral portion of the end plate 3a of the orbiting scroll member 3 through the shoes 29, the lever 32 swingably engaging with the ends of the piezoelectric actuators 28.

Figure 15:
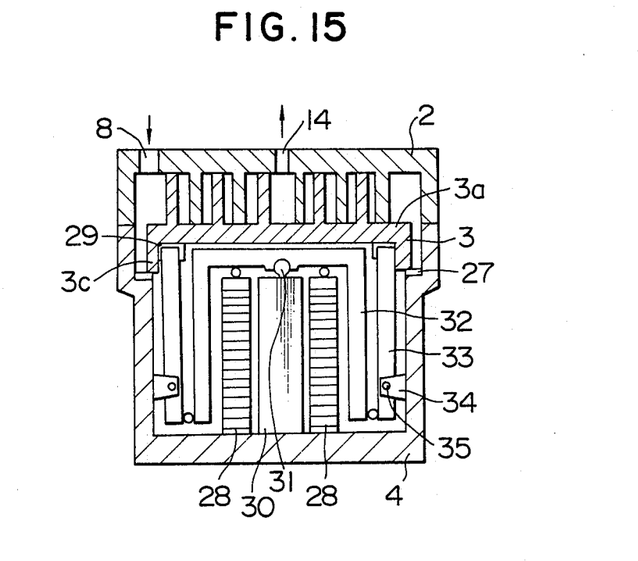
FIG. 15 is a vertical sectional view of a sixth embodiment of the present invention.

As in the cases of the preceding embodiments, when the piezoelectric actuators are energized by A.C. voltages which are different from each other in phase, the differences in phase corresponding to the differences in position of the piezoelectric actuators 28, the strain of each piezoelectric actuator is magnified and transmitted to the orbiting scroll member by the levers 32, 33 so that the orbiting scroll member can orbit at a large radius.

Figure 16:
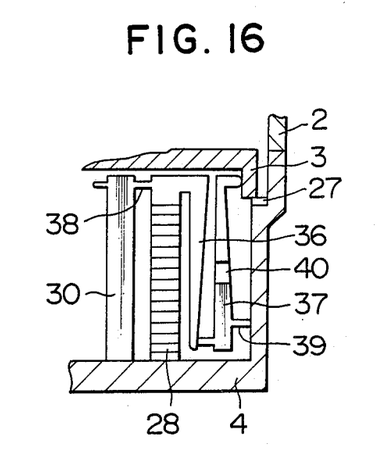
FIG. 16 is an illustration of actuator means in a seventh embodiment of the present invention.
Figure 17:
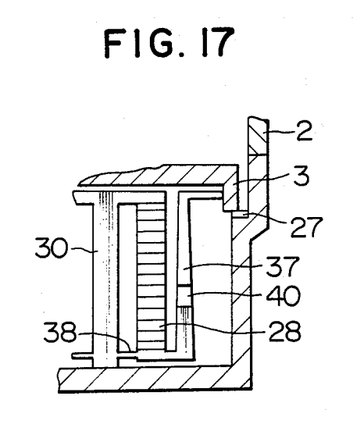
FIG. 17 is an illustration of actuator means in an eighth embodiment of the present invention.

FIGS. 16 and 17 illustrate two embodiments having different mechanisms for magnifying the strain. Referring first to FIG. 16, a plurality of piezoelectric linear actuators 28 (in FIG. 16, only one of them is shown) are arranged around the central axis of the stationary scroll member 2 at uniform distance therefrom and are oriented perpendicularly to the rear surface of the orbiting scroll member 3. Each linear piezoelectric actuator 28 engages with a lever 36 one end of which is coupled by a leaf spring joint 38 with the central seat 30 of the frame 4. The other end of the lever 36 engages with one end of a lever 37 which is coupled with the frame 4 by a leaf spring joint 39. The other end of the lever 37 fits with the inner surface of the peripheral seat of the orbiting scroll member 3. The peripheral portion of the orbiting scroll member 3 is supported by a thrust seat 27 arranged on the frame 4. As will be shown in FIG. 18, the lever 37 has a leaf spring joint 40 so that the orbiting motion of the orbiting scroll member is permitted.

In the embodiment shown in FIG. 17, the scroll machine has a single lever magnifying mechanism with a leaf spring joint instead of a double lever magnifying mechanism as shown in FIG. 16.

Figure 18:
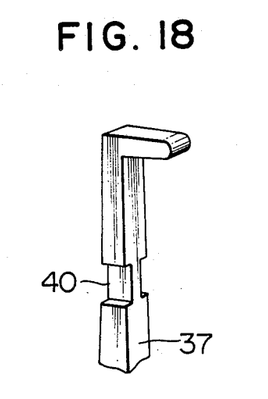
FIG. 18 is a perspective view of a portion of a lever incorporated in actuator means of FIG. 17.

The embodiments of FIGS. 16 and 17 have a common feature that play of the motion transmitting mechanism thereof is extremely small in contrast to the magnifying mechanism having pin-joint and the like, so that the precision of the orbiting motion of the orbiting scroll member is enhanced. As shown in FIG. 18, the lever 37 engaging directly with the orbiting scroll member 3 can move slightly in the circumferential direction of the orbiting scroll member 3 by action of the leaf spring joint 40, so that the orbiting scroll member 3 can orbit. The leaf spring joint 40, on the other hand, has a enough stiffness to prevent the orbiting scroll member 3 from rotating on its own axis.

In both the embodiments described hereinbefore, the speed of orbiting motion of the orbiting scroll member can be varied by varying the frequencies of the A.C. voltages energizing piezoelectric actuators and, the direction of the orbiting motion of the orbiting scroll member can be reversed by inverting the phases of the A.C. voltages energizing the piezoelectric actuators. The mechanism for driving the orbiting scroll member does not include any members which slide at a large speed. The oil-free scroll-type fluid machine, therefore, is provided in which lubricant oil is not used and the seat 27 supporting the orbiting scroll member is made of a self-lubricating material. According to the embodiments described in FIGS. 9 to 17, it is thus possible to provide a compact, light-weight and efficient scroll-type fluid machine which enables easy control of operation speed and operation direction and which can operate under an oil-free condition.

In the embodiments shown in FIGS. 9 to 17, linear actuators of piezoelectric elements are used. Alternatively, the other linear actuators such as linear solenoids may be used.

In the embodiments described hereinbefore, linear displacements of linear actuators such as piezoelectric elements are converted into orbiting motion of the orbiting scroll member, and the orbiting scroll member and the stationary scroll member compress and pump a fluid. Consequently, a scroll-type fluid machine which has reduced size and weight and which can operate at high speed and at a high efficiency and whose operation direction and speed can be easily controlled and which can operate under an oil-free condition, is provided. In the embodiments, the thrust seats bear axial thrust force of the orbiting scroll member and guide the orbiting scroll member without any clearance therebetween. In consequence, the clearance between the wraps does not change and unstable motion of the orbiting scroll member such as fluttering motion does not occur, although moment of force is generated on the orbiting scroll member by the gas pressure during operation of the machine, so that low vibration and high efficiency of the machine are achieved. Further, low noise is also achieved, since the actuators do not produce any electromagnetic sound and the bearings are not used.

Figure 19:
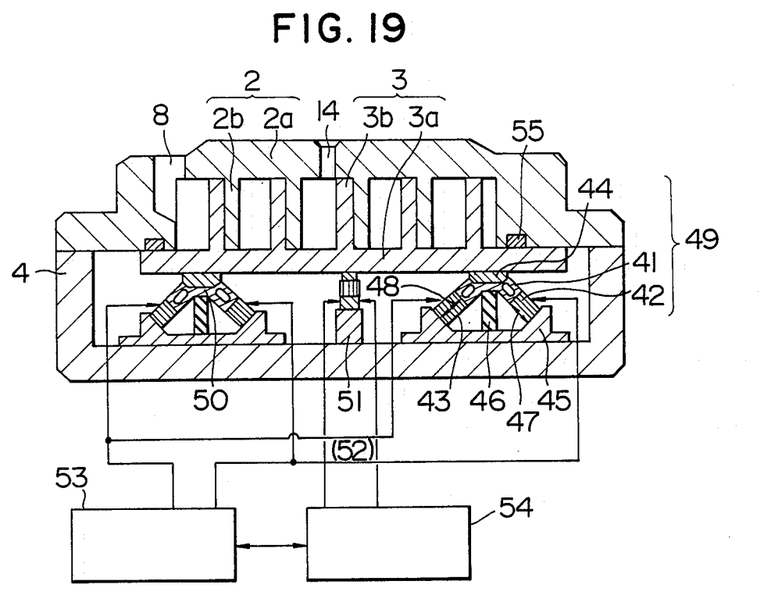
FIG. 19 is a sectional side elevation of a ninth embodiment of the present invention.

Another embodiment of the scroll-type fluid machine according to the present invention will be described with reference to FIG. 19. In this embodiment, a plurality of actuators are arranged on the reverse surface of the end plate 3a of the orbiting scroll member 3. Each actuator includes a pair of piezoelectric elements 42 and 43 whose axes form a triangle together with the stationary frame 4 as shown in FIG. 19 and at the top ends of which an actuating end portion 44 joining these piezoelectric elements 42 and 43 are arranged. The actuators are energized by controllers 53 and 54 such that the piezoelectric elements 42 and 43 transform in the directions denoted by arrows 47 and 48. The orbiting scroll member 3 is moved by the actuating end portion 44. In consequence, a gas is compressed in a closed chamber formed between the wraps 2b, 3b of both scroll members 2 and 3.

The embodiment shown in FIG. 19 will be described in more detail. The stationary scroll member 2 having the end plate 2a and the spiral wrap 2b is fixed to the frame 4. The end plate 2a is provided with fluid passage ports 8 and 14. On the other hand, the orbiting scroll member 3 has the end plate 3a and the spiral wrap 3b whose spiral shape is the same as the stationary scroll member.

The stationary scroll member 2 and the orbiting scroll member 3 are assembled together with their wraps 2b and 3b meshing with each other so that a closed chamber for compression is defined. A plurality of actuators 49 to 52 for driving the orbiting scroll member are arranged on the reverse surface of the end plate 3a of the orbiting scroll member 3. These actuators have an uniform structure, for example, the actuator 49 has a pair of piezoelectric elements 42 and 43 which form a triangle together with the stationary frame 4, an actuating shoe 44 joining the piezoelectric elements and a flexible joint portion 41 which is disposed between the piezoelectric elements and the actuating shoe. Each of the piezoelectric elements 42 and 43 is made of, for example, lead zirconate titanate [Pb(r·Ti)O$_3$](normally referred to as PZT) and has a laminated structure in which a large strain is generated by a low driving voltage. The driving shoe 44 is made of a wear-resistant material and is pressed at its one side against the end plate 3a of the orbiting scroll member 3. The flexible joint portion 41 arranged between the piezoelectric elements 42, 43 and the actuating shoe 44 transmits a force rigidly only in the direction of displacement of the piezoelectric element denoted by arrows 47 and 48. The flexible joint portion 41 has flexibility in the direction perpendicular to the arrows 47 and 48. The base ends of the piezoelectric elements 42 and 43 are fixed on inclined surfaces of a base 45, the angle between the inclined surface and a bottom surface of the stationary frame being 45°. An elastic member 46 arranged between the base 45 and the flexible joint portion 41 applies compression force to the piezoelectric elements 42 and 43. An elastic member 55 arranged on a peripheral portion of the end plate 2a of the stationary scroll member 2 faces the end plate 3a of the orbiting scroll member 3 so that the end plate 3a is pressed against the actuating shoes 44. The elastic member 55 also serves as a seal element which hermetically seals the inside space. Other actuators 50 to 52 have the same construction as the actuator 49. In order to provide the orbiting scroll member with an orbiting motion of a predetermined radius, these actuators 49 to 52 are arranged in the following manner. The actuators 49 and 50 are arranged on a common axis which is referred to as "X-axis", while the other actuators 51 and 52 are arranged on a common axis which is referred to as "Y-axis".

The piezoelectric elements 42 and 43 of the actuators are energized by controllers 53, 54 each of which includes an oscillator, an amplifier, a phase converter and a power supply. More specifically, the actuators 49, 50 arranged on the X-axis are operated by the controller 53, while another pair of actuators 51, 52 arranged on the Y-axis are operated by the other controller 54. In order to control the actuators of the X axis and the actuators of Y axis separately, the controllers 53 and 54 compensate the phases of the driving voltages.

Figure 20:
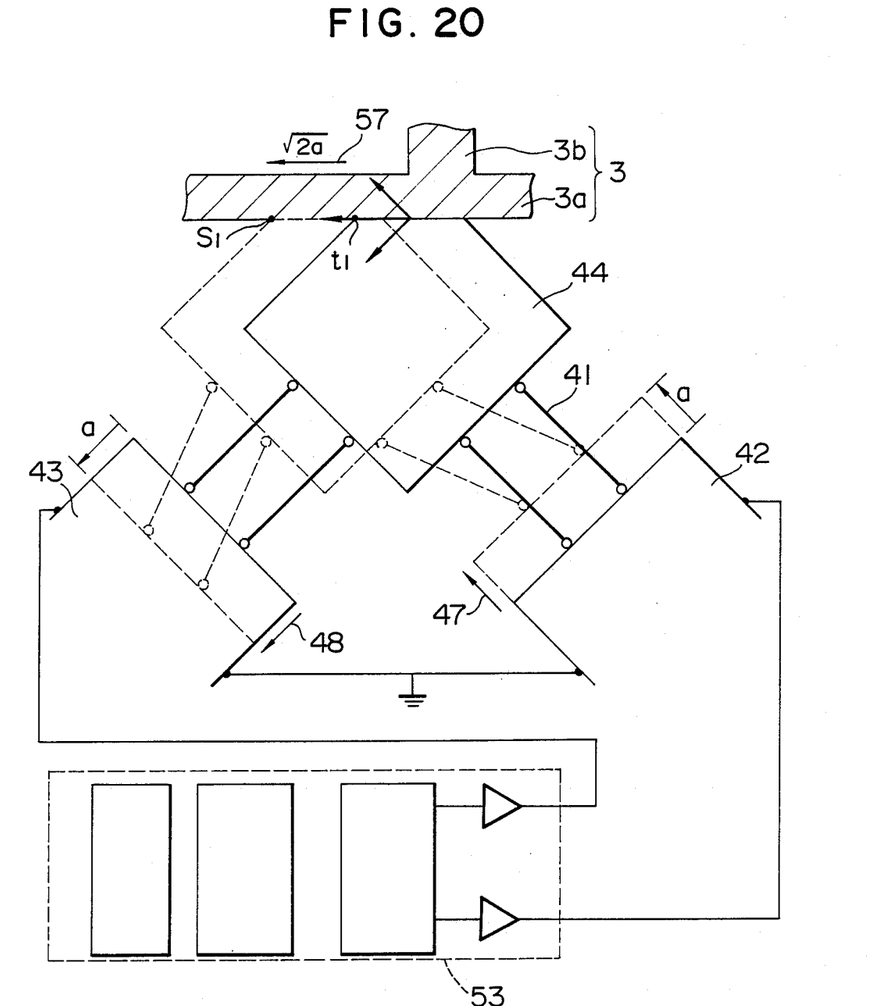
FIG. 20 is an illustration of the motion of the embodiment shown in FIG. 19.

The operation of this embodiment will be described with reference to FIG. 20. As the piezoelectric elements 42 and 43 are energized by A.C. voltages with a suitable phase difference, the piezoelectric elements 42 and 43 transform, i.e., expand and contract, by an amount a in the respective directions 47 and 48. These minute displacements are transmitted, without mutual interference, to the actuating shoe of the actuator through the flexible joint portion 41 which serves as a parallel link mechanism, such that the point of contact between the actuating shoe 44 and the orbiting scroll member 3 is shifted from a position indicated at $t_1$ to a position indicated at $S_1$, whereby the actuating shoe 44 moves the orbiting scroll member 3 in a direction indicated by an arrow 57.

Since the actuating shoes 44 of all the actuators 49 to 52 move along an elliptical orbit, the orbiting scroll member 3 against which these shows 44 are pressed is driven in one direction. More specifically, when A.C. voltages with a given phase difference are applied to the piezoelectric elements 42 and 43 whose axes intersect with the plane of the end plate 3a of the orbiting scroll member 3 at 45 degrees, the actuating shoe 44 on the tops of these piezoelectric elements moves along an elliptical orbit according to degrees of the driving voltage. Representing the amplitude of displacement of each piezoelectric element by a, a displacement of the actuating shoe 44 in the direction parallel to the direction of the contact surface is approximately $\sqrt{2}a$. The displacements of the actuators on the X-axis and of the actuators on the Y-axis are controlled to cooperate with each other (90° phase compensation), so that the orbiting scroll member 3 orbits at a predetermined radius without rotating on its own axis. The orbiting scroll member cooperates with the stationary scroll member 2 to compress a fluid therebetween. The elastic member 55 not only bears an axial thrust force but also functions as a sealing member for preventing the gas compressed in the compression chamber from leaking out of the compression chamber, so that the scroll-type fluid machine in accordance with the described embodiment can serve as a compressor by which various gases can be compressed. In addition, since the piezoelectric actuators are compressed during the operation of the machine, the durability of these actuators, made of ceramics material which is weak in tensile stress, can be remarkably improved, thus providing a high reliability of the machine.

In the present embodiment of the scroll-type fluid machine of the invention, the orbiting scroll member is directly driven by a plurality of piezoelectric motors, therefore, the scroll-type fluid machine has a reduced axial height. In consequence, the size and weight of the machine of the present invention can remarkably be reduced as compared with known scroll-type fluid machines which are driven by conventional electric motors. In addition, since the piezoelectric motors directly support the orbiting scroll members, bear thrust force of the orbiting scroll member and guide the orbiting scroll member without any clearance therebetween, any variation of the clearance between the wraps of both scroll members does not occur and any unstable motion of the orbiting scroll member such as fluttering motion is not produced by moment of force which is generated by the pressure of the gas compressed between both scroll members during operation of the machine, whereby low vibration and high efficiency is achieved. In addition, the reliability of the machine is enhanced since the amount of sliding parts such as bearings is extremely decreased. Though the piezoelectric motors have contacting vibratory parts, they can operate without lubrication, so that a completely oil-free scroll type fluid machine can be provided. In addition, magnetic sound is not provided. In addition, magnetic sound is not produced, and, at the same time, bearing are not used in the machine, so that the noise of the whole machine can remarkably be reduced. The piezoelectric motors not only drive the orbiting scroll member to orbit but also functions as means for preventing the orbiting scroll member from rotating on its own axis. Furthermore, the piezoelectric motors used in the scroll-type fluid machine of the present invention may be made from a ceramics material which has a high resistance to corrosion. The scroll-type fluid machine of the present invention, therefore, can be used as a vacuum pump in semiconductor producing devices.

Figure 21:
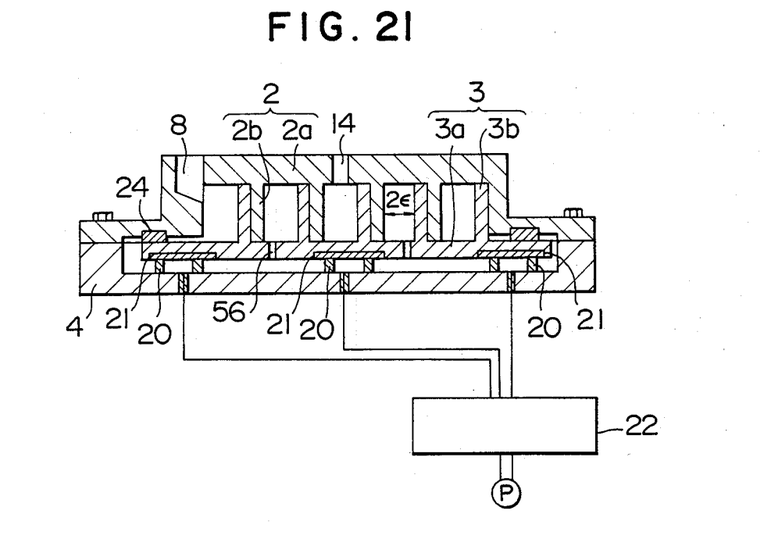
FIG. 21 is a sectional side elevation of a tenth embodiment having an introduction port formed in the orbiting scroll member.

FIG. 21 shows a different embodiment of the present invention. In this embodiment, the orbiting scroll member 3 is provided with an inlet port 56 through which the compressed fluid flows to a space which is defined by the reverse surface of the orbiting scroll member and the frame 4. Other portions are the same as the embodiment shown in FIG. 1, and these portions may be applied in the other preceding embodiment.

In the embodiment shown in FIG. 21, the fluid of an intermediate pressure between the suction pressure and the discharge pressure flows into the above-mentioned space so that the orbiting scroll member 3 is pressed against the stationary scroll member 2 by a force which is generated by difference in pressure between the compression chamber and the above-mentioned space. Therefore, an excessively large load is not produced on the end plate 3a of the orbiting scroll member, if the position of the introduction port 56 is adequately selected. Further the axial thrust force which is born by the piezoelectric motors and/or the thrust seat is reduced. Operation other than described above is the same as the preceding embodiment.

What is claimed is:

1. A scroll-type fluid machine, having a frame, a stationary scroll member attached to said frame and an orbiting scroll member, each scroll member having an end plate and a spiral wrap projecting axially from one side of said end plate, said stationary scroll member and said orbiting scroll member being assembled with said wraps of both scroll members meshing with each other, said orbiting scroll member orbiting around an axis of said stationary scroll member without rotating on its own axis so that volumes of closed chambers defined by the end plates and wraps of both scroll members progressively vary to transport a fluid, said scroll-type fluid machine further comprising:
a plurality of actuators which contact with said orbiting scroll member and expand or contract in response to voltages supplied to said actuators, contact points between actuators and said orbiting scroll member being moved by expansion and contraction of said actuators so that said orbiting scroll member orbit.

2. A scroll-type fluid machine, having a stationary scroll member and an orbiting scroll member, each scroll member having an end plate and a spiral wrap projecting axially from one side of said end plate, said stationary scroll member and said orbiting scroll member being assembled with said wraps of both scroll members meshing with each other, said orbiting scroll member orbiting around an axis of said stationary scroll member without rotating on its own axis so that volumes of closed chambers defined by the end plates and wraps of both scroll members progressively vary to transport a fluid, said scroll-type fluid machine comprising:
a plurality of actuators contacting with said orbiting scroll member and expanding or contracting in response to voltages supplied to said actuators, said orbiting scroll member being driven by said actuators in a predetermined direction, the composite velocity of said actuators is controlled so that said orbiting scroll member orbits.

3. A scroll-type fluid machine according to claim 1, wherein said actuator is a piezoelectric actuator of piezoelectric elements.

4. A scroll-type fluid machine according to claim 3, wherein said piezoelectric actuator is a ring-shaped piezoelectric motor and said orbiting scroll member is provided with a slider sliding on said actuator.

5. A scroll-type fluid machine according to claim 4, wherein a plurality of said ring-shaped piezoelectric motors are arranged at the center of a frame of said machine and on a peripheral portion of said frame at uniform distance from the central axis of said frame, said piezoelectric motors being energized by high-frequency voltages.

6. A scroll-type fluid machine according to claim 4, wherein the radius of said ring-shaped piezoelectric motor is substantially equal to the radius of orbiting motion of said orbiting scroll member.

7. A scroll-type fluid machine according to claim 4, wherein said slider has a first slider part having an eccentric pin whose eccentric distance from the central axis of said ring-shaped piezoelectric motor is equal to the radius of orbiting motion of said orbiting scroll member and sliding on said piezoelectric actuator, and a second slider part having a hole for fitting rotatably with said pin and being fixed in a recess formed in said orbiting scroll member.

8. A scroll-type fluid machine according to claim 3, wherein said piezoelectric actuator is a linear piezoelectric motor.

9. A scroll-type fluid machine according to claim 3, wherein each said piezoelectric actuator includes a pair of piezoelectric elements which form a triangle with said frame, and an actuating shoe is arranged on the tops of said piezoelectric elements.

10. A scroll-type fluid machine according to claim 8, wherein said linear piezoelectric motors are arranged on the axes which cross perpendicularly to each other at the center of said stationary scroll member, said orbiting scroll member is driven at a speed which equals to the composite speed composed of the speed components of said linear piezoelectric motors.

11. A scroll-type fluid machine, comprising a stationary scroll member and an orbiting scroll member, each scroll member having an end plate and a spiral wrap projecting axially from one side of said end plate, said stationary scroll member and said orbiting scroll member being assembled with said wraps of both scroll members meshing with each other, said orbiting scroll member orbiting around an axis of said stationary scroll member without rotating on its own axis so that volumes of closed chambers defined by the end plates and wraps of both scroll members progressively vary to transport a fluid, said machine further comprising driving means for the orbiting motion of said orbiting scroll member which are piezoelectric motors including piezoelectric elements, said piezoelectric motors confining the axial movement of said orbiting scroll member.

12. A scroll-type fluid machine according to claim 3, wherein said piezoelectric actuators are disposed on at least one side of said orbiting scroll member.

13. A scroll-type fluid machine according to claim 8, wherein said piezoelectric actuators are disposed on at least one side of said orbiting scroll member.

14. A scroll-type fluid machine, having a stationary scroll member and an orbiting scroll member, each scroll member having an end plate and a spiral wrap whose spiral shape is an involute or a similar curve and which projects axially from one side of said end plate, said stationary scroll member and said orbiting scroll member being assembled with said wraps of both scroll members meshing with each other and with said end plates parallel to each other, said orbiting scroll member orbiting around an axis of said stationary scroll member without rotating on its own axis so that volumes of closed chambers defined by the end plates and wraps of both scroll members progressively vary to transport a fluid, said scroll-type fluid machine further having a stationary member, said stationary scroll member being fixed at its peripheral portion to the stationary member, said orbiting scroll member being supported on said stationary member and moving on a plane parallel to said end plates, said scroll-type fluid machine further having a plurality of linear actuators arranged between said stationary member and the rear surface of said orbiting scroll member, said rear surface being the reverse surface of the surface facing said stationary scroll member, radial displacements produced by said linear actuators and oriented toward the center of said stationary scroll member being transmitted to said rear surface of said orbiting scroll member, said linear actuators being energized by A.C. voltages whose phases are different from each other, the differences in phase corresponding to the angles between the axes of said displacements of said linear actuators so that said orbiting scroll member orbits without rotating on its own axis.

15. A scroll-type fluid machine according to claim 14, wherein each of said radial displacements is produced by said linear actuator in which the direction of expansion and contraction thereof is the same as the direction of said radial displacement.

16. A scroll-type fluid machine according to claim 14, further comprising displacement magnifying mechanisms which magnify the radial displacements of said linear actuators and transmit the magnified displacements to the orbiting scroll member.

17. A scroll-type fluid machine according to claim 14, wherein each of said linear actuators includes a laminated bar-shaped member comprising a plurality of layers of piezoelectric elements.

18. A scroll-type fluid machine according to claim 15, wherein each of said linear actuators includes a laminated bar-shaped member comprising a plurality of layers of piezoelectric elements.

19. A scroll-type fluid machine according to claim 16, wherein each of said linear actuators includes a laminated bar-shaped member comprising a plurality of layers of piezoelectric elements.

20. A scroll-type fluid machine according to claim 1, further comprising small apertures located in positions opened to the intermediate compression closed chamber and through which the pressurized fluid flows from said compression chamber to the rear space of said orbiting scroll member, said rear space being defined by the rear surface of said orbiting scroll member and said frame.

21. A scroll-type fluid machine according to claim 14, further comprising small apertures located in positions opened to the intermediate compression closed chamber and through which the pressurized fluid flows from said compression chamber to the rear space of said orbiting scroll member, said rear space being defined by the rear surface of said orbiting scroll member and said frame.

* * * * *